(12) United States Patent
Berkhin et al.

(10) Patent No.: US 7,533,092 B2
(45) Date of Patent: May 12, 2009

(54) LINK-BASED SPAM DETECTION

(75) Inventors: Pavel Berkhin, Sunnyvale, CA (US); Zoltan Istvan Gyongyi, Stanford, CA (US); Jan Pedersen, Los Altos Hills, CA (US)

(73) Assignee: Yahoo! Inc., Sunnyvale, CA (US)

( * ) Notice: Subject to any disclaimer, the term of this patent is extended or adjusted under 35 U.S.C. 154(b) by 323 days.

(21) Appl. No.: 11/198,471

(22) Filed: Aug. 4, 2005

(65) Prior Publication Data

US 2006/0095416 A1 May 4, 2006

Related U.S. Application Data

(60) Provisional application No. 60/623,295, filed on Oct. 28, 2004.

(51) Int. Cl.
*G06F 7/00* (2006.01)
*G06F 17/30* (2006.01)
(52) U.S. Cl. ................... 707/5; 707/7; 707/102
(58) Field of Classification Search ............ 707/1–10, 707/100–104.1, 200–206; 715/513, 234
See application file for complete search history.

(56) References Cited

U.S. PATENT DOCUMENTS

| | | | |
|---|---|---|---|
| 4,167,652 A | 9/1979 | Braugenhardt et al. |
| 6,285,999 B1 | 9/2001 | Page |
| 6,529,903 B2 | 3/2003 | Smith et al. |
| 6,678,681 B1 | 1/2004 | Brin |
| 6,728,752 B1 | 4/2004 | Chen et al. |
| 6,865,575 B1 | 3/2005 | Smith et al. |
| 2002/0059221 A1 | 5/2002 | Whitehead et al. |
| 2002/0061022 A1 | 5/2002 | Allen et al. |
| 2003/0002436 A1 | 1/2003 | Anderson et al. |
| 2003/0204502 A1 | 10/2003 | Tomlin et al. |
| 2004/0002988 A1 | 1/2004 | Seshadri et al. |
| 2004/0143600 A1 | 7/2004 | Musgrove et al. |
| 2004/0199445 A1 | 10/2004 | Eder |

(Continued)

OTHER PUBLICATIONS

Varlamis et al., THESUS, a closer view on Web content management enhanced with link semantics, Jun. 2004, IEEE, vol. 16, 685-700.*

(Continued)

*Primary Examiner*—Jean B Fleurantin
(74) *Attorney, Agent, or Firm*—Hickman Palermo Truong & Becker LLP

(57) ABSTRACT

A computer implemented method of ranking search hits in a search result set. The computer-implemented method includes receiving a query from a user and generating a list of hits related to the query, where each of the hits has a relevance to the query, where the hits have one or more boosting linked documents pointing to the hits, and where the boosting linked documents affect the relevance of the hits to the query. The method associates a metric to each of at least a subset of the hits, the metric being representative of the number of boosting linked documents that point to each of at least a subset of the hits and which artificially inflate the relevance of the hits. The method then compares the metric, which is representative of the size of a spam farm pointing to the hit, with a threshold value, processes the list of hits to form a modified list based in part on the comparison, and transmits the modified list to the user.

10 Claims, 3 Drawing Sheets

U.S. PATENT DOCUMENTS

| | | | |
|---|---|---|---|
| 2005/0071741 | A1 | 3/2005 | Acharya et al. |
| 2005/0210008 | A1 | 9/2005 | Tran et al. |
| 2005/0243850 | A1 | 11/2005 | Bass et al. |
| 2005/0251468 | A1 | 11/2005 | Eder |
| 2006/0064411 | A1* | 3/2006 | Gross et al. .................... 707/3 |
| 2006/0085248 | A1 | 4/2006 | Arnett et al. |
| 2006/0085391 | A1 | 4/2006 | Turski et al. |
| 2006/0218010 | A1 | 9/2006 | Michon et al. |

OTHER PUBLICATIONS

Mishra et al., KhojYantra: an integrated MetaSearch engine with classification, clustering and ranking, Sep. 18-20, 2000, IEEE, 122-131.*

"Notification of Transmittal of the International Search Report And the Written Opinion of the International Searching Authority, or the Declaration" from corresponding PCT case, International Application No. PCT/US2005/038619.

Fetterly, D. et al., "Spam, Damn Spam, and Statistics" XP-002366339, *Seventh International Workshop on the Web and Databases* (2004) pp. 1-6.

Gyöngyi, Z. et al., "Combating Web Spam with TrustRank" XP-002366338, *Technical Report*, Stanford University (2004) pp. 1-21.

Westbrook, A. et al., "Using Semantic Analysis to Classify Search Engine Spam" XP009056143, *Product Report of CS276A* (2003), 4 pages.

Zhang, H. et al., "Improving Eigenvector-Based Reputation Systems Against Collusions" XP-002366378, *Workshop on Algorithms and Models for the Web Graph* (2004), 20 pages.

Benczur et al., "SpamRank—Fully Automatic Link Spam Detection Work in progress," pp. 1-14.

Fetterly et al., "Spam, Damn Spam, and Statistics—Using statistical analysis to locate spam web pages," *Seventh International workshop on the Web and Databases*, Jun. 17-18, 2004, Paris, France (6 pages).

Gyongyi et al., "Combating Web Spam with TrustRank," *Proceedings of the 30th VLDB Conference*, Toronto, Canada, 2004 (12 pages).

Gyongi et al., "Web Spam Taxonomy," presented at AIRWeb '05: First International Workshop on Adversarial Information Retrieval on the Web, 14th International World Wide Web Conference (WWW2005), May 10-14, 2005, Chiba, Japan.

* cited by examiner

Simple spam farm

Simple spam farm with backlinks

LINK-BASED SPAM DETECTION

CROSS-REFERENCES TO RELATED APPLICATIONS

The present application claims priority to U.S. Provisional Patent Application No. 60/623,295, filed Oct. 28, 2004. Furthermore, the present disclosure is related to U.S. patent application Ser. No. 10/942,335, filed Sep. 15, 2004, entitled "Automatic Updating of Trust Networks in Recommender Systems" to Berkhin et al., assigned to the assignee herein. The respective disclosures of these applications are incorporated herein by reference in their entirety for all purposes.

BACKGROUND OF THE INVENTION

The present invention relates generally to search systems and more particularly to search systems that rank search hits in a result set.

Searching is useful where an entire corpus cannot be absorbed and an exact pointer to desired items is not present or is not possible. In general, searching is the process of formulating or accepting a search query, determining a set of matching documents from a corpus of documents and returning the set or some subset of the set if the set is too large. In a specific example, which this disclosure is not limited to, consider searching the set of hyperlinked documents referred to as the "Web". The corpus contains many searchable items, referred to herein as pages or, more generically, documents. A search engine identifies documents from the corpus that match a search query, typically using an index generated in advance of receipt of a search query. A "match" can mean many things and a search query can be of various forms. Commonly, a search query is a string comprising one or more words or terms and a match happens when a document includes one or more of the words or terms (or all of them) from the search query string. Each matching document is referred to as a hit and the set of hits is referred to as the result set or the search results. The corpus can be a database or other data structure or unstructured data. The documents are often Web pages.

A typical index of Web pages contains billions of entries, so a common search might have a result set comprising millions of pages. Clearly, in such situations, the search engine might have to constrain the result set further in order that what is returned to the querier (which is typically a human computer user, but need not be the case) is of a reasonable size. One approach to constraining the set is to present the search results in an order with the assumption that the user will only read or use a small number of hits that appear higher in the ordered search results.

Because of this assumption, many Web page authors desire that their pages appear high in the ordered search results. A search engine relies on various features of the relevant pages to select and return only the highest quality ones. Since top positions (high ranking) in a query result list may confer business advantages, authors of certain Web pages attempt to maliciously boost the ranking of their pages. Such pages with artificially boosted ranking are called "web spam" pages and are collectively known as "web spam."

There are a variety of techniques associated with web spam. One is to make a Web page artificially appropriate for being selected by many queries. This can be achieved by augmenting a page with massive numbers of terms that are unrelated to the essential content and are rendered in small or invisible fonts. Such augmentation makes a page more exposed (i.e., potentially relevant to more queries), but does not truly improve its relevance for any particular query. In this regard, authors of spam use another technique: they add to a page many incoming (hyper)links, also called inlinks, based on the observation that pages more frequently referenced by others are generally considered by search engines as being preferable (of higher relevance). It is difficult to distinguish between real high-quality pages referenced by many others due to their superior value, and web spam with many inlinks.

Identification of web spam pages and their subsequent demotion in a search result list is important for maintaining or improving the quality of answers produced by a search engine. Thus, web spam detection is a useful task for a search engine. Human editors are frequently employed to identify web spam by verifying large numbers of pages present in the search engine index, but that is often impractical.

Therefore, there is a need for an improved search processing that overcomes web spam and provides search results that are more in line with what users want rather than in line with manipulations of document authors.

BRIEF SUMMARY OF THE INVENTION

Embodiments of the present invention provide systems and methods for processing search requests, including ranking hits that form a search result set. Hits can be ranked using their effective mass, which is a measure of the size of a spam farm pointing to a particular page, and other parameters.

In one embodiment, the present invention provides a computer implemented method of ranking search hits in a search result set. The computer-implemented method includes receiving a query from a user and generating a list of hits related to the query, where each of the hits has a relevance to the query, where the hits have one or more boosting linked documents pointing to the hits, and where the boosting linked documents affect the relevance of the hits to the query. The method then associates a metric for each of at least a subset of the hits, the metric being representative of the number of boosting linked documents that point to each of at least a subset of the hits and which artificially inflate the relevance of the hits. The method then compares the metric, which is representative of the size of a spam farm pointing to the hits, with a threshold value, processes the list of hits to form a modified list based in part on the comparing, and transmits the modified list to the user.

In one aspect, the metric is a combination of a first measure and a second measure. The first measure for a hit is representative of the link popularity of the hits, and the second one is a measure of the likelihood that a hit is a reputable document.

In another aspect, the second measure is generated by forming a seed set of reputable documents, the seed set of reputable documents being linking documents, assigning a trust value to each of the documents in the seed set, propagating the trust value to each of the linked documents being pointed to by the linking documents, and assigning a prorated trust value to each of the linked documents.

In another aspect, the seed set of reputable documents is formed by determining for each of a plurality of documents an outlink metric representative of the number of outlinks of each of the documents, ranking the plurality of documents using the outlink metric, identifying a set of highest ranked documents, evaluating the quality of the highest ranked documents, forming a modified set of documents by removing from the highest ranked documents those documents deemed inappropriate, and forming a seed set using the modified retained set.

The following detailed description together with the accompanying drawings will provide a better understanding of the nature and advantages of the present invention.

DETAILED DESCRIPTION OF THE INVENTION

Definitions

Figure 1:
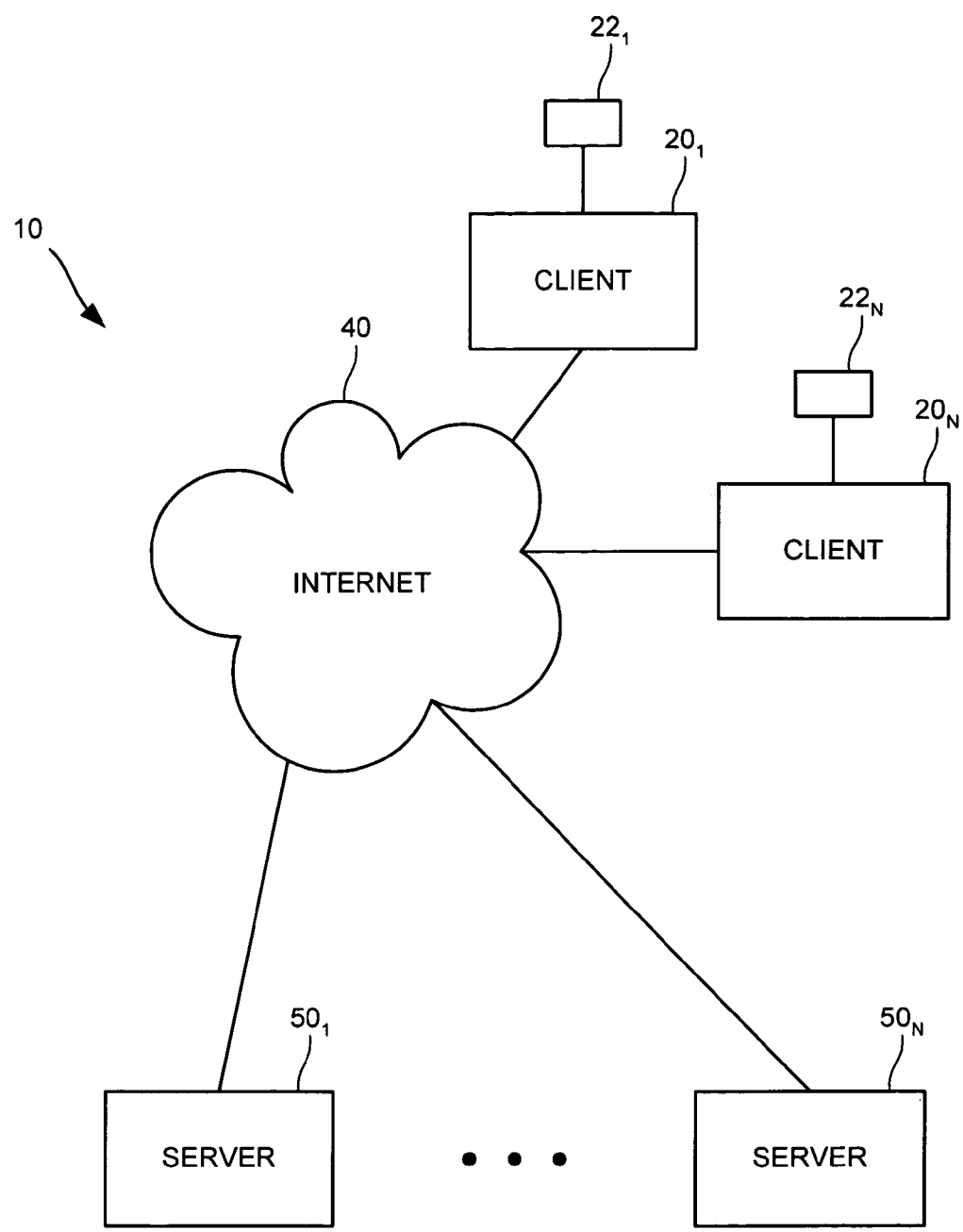
FIG. 1 is an exemplary block diagram of an information retrieval and communication network that may be used to practice the embodiments of the present invention.

Unless defined otherwise, all technical and scientific terms used herein have the meaning commonly understood by a person skilled in the art to which this invention pertains. As used herein, the following terms are defined as follows.

PageRank is a family of well known algorithms for assigning numerical weights to hyperlinked documents (or web pages or web sites) indexed by a search engine. PageRank uses link information to assign global importance scores to documents on the web. The PageRank process has been patented and is described in U.S. Pat. No. 6,285,999. The PageRank of a document is a measure of the link-based popularity of a document on the Web.

TrustRank is a link analysis technique related to PageRank. TrustRank is a method for separating reputable, good pages on the Web from web spam. TrustRank is based on the presumption that good documents on the Web seldom link to spam. TrustRank involves two steps, one of seed selection and another of score propagation. The TrustRank of a document is a measure of the likelihood that the document is a reputable (i.e., a nonspam) document.

A link or hyperlink refers to clickable content on a web page that usually leads to another page, another site or another part of the same page. The clickable content therefore is said to link to the other page/site/part of the same page. Spiders use links to crawl from one page to the next as they index web sites.

Inbound link or an inlink/outbound link or outlink. When site A links to site B, site A has an outbound link and site B has an inbound link. Inbound links are counted to determine link popularity.

The Web, or the World Wide Web ("WWW", or simply "Web") is an information space in which the items of interest, referred to as resources, are identified by global identifiers called Uniform Resource Identifiers (URI). The term Web is often used as a synonym for the Internet; however, the Web is actually a service that operates over the Internet.

A web page or a webpage refers to a page or file of the World Wide Web, usually in HTML/XHTML format (the file extensions are typically htm or html) and with hypertext links to enable navigation from one page or section to another. Webpages often use associated graphics files to provide illustration, and these too can be clickable links. A webpage is displayed using a web browser, and can be designed to make use of applets (subprograms than run inside the page) which often provide motion, graphics, interaction, and sound.

A web site refers to a collection of webpages stored in a single folder or within related subfolders of a web server. A web site generally includes a front page typically named index.htm or index.html.

A web host is in the business of providing server space, web services and file maintenance for web sites controlled by individuals or companies that do not have their own web servers. Many Internet Service Providers (ISPs) will allow subscribers a small amount of server space to host a personal web page.

Spam refers to unwanted documents or e-mails usually of a commercial nature that are distributed in bulk.

Web spam refers to spam pages on the web. The act of creating web spam is referred to as web spamming. Web spamming refers to actions intended to mislead search engines to give some documents higher rankings that they deserve. Spam pages on the web are the results of some form of spamming. One form of spamming is link spamming.

A spam page is a web document that receives a significant illegitimate boost in its ranking score and therefore is likely to show up in the top search results and is intended to mislead a search engine.

Link spamming refers to the creation of spam documents that are often interconnected and form groups called spam farms, which are built so that a large number of boosting documents would increase the link-based importance ranking of one or a few target pages.

Spam farm refers to a group of interlinked spam pages that are created to boost the link-based importance score (e.g., PageRank scores) of specific target pages.

Overview

The embodiments of the present invention are directed to methods and systems for the detection of link-based spam. Search results produced in response to a search query are processed to determine the effective mass of the hits. The effective mass of a hit is a measure of the size of the spam farm that has been created to point to the hit and thus artificially boost the hit's relative importance. The method and system in accordance with the embodiments of the present invention use the effective masses of the hits and demote those hits whose effective mass renders them likely to be artificially boosted by link-based spam. The determination of the effective mass for a given web document relies on a combination of techniques that in part assess the discrepancy between the link-based popularity (e.g., PageRank) and the trustworthiness (e.g., TrustRank) of a given web document. The techniques for the determination of the effective mass of given web document are described below in further detail.

A Network Implementation

FIG. 1 illustrates a general overview of an information retrieval and communication network 10 including one or more client systems $20_{1-N}$ that may be used to practice the embodiments of the present invention. In computer network 10, client system(s) $20_{1-N}$ are coupled through the Internet 40, or other communication network, (e.g., over any local area network (LAN) or wide area network (WAN) connection), to any number of server systems $50_1$ to $50_N$. As will be described herein, client system(s) $20_{1-N}$ are configured according to the present invention to communicate with any of server systems $50_1$ to $50_N$, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, personal digital assistant (PDA), cell phone, or any WAP-enabled device or any other computing device capable of interfacing directly or indirectly to the Internet. Client system 20 typically runs a browsing program, such as Microsoft's Internet Explorer™ browser, Netscape Navigator™ browser, Mozilla™ browser, Opera™ browser, Apple's Safari™ or a WAP-enabled browser in the case of a cell phone, PDA or other wireless device, or the like, allowing a user of client system $20_{1-N}$ to access, process and view information and pages available to it from server systems $50_1$ to $50_N$ over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems $50_1$ to $50_N$ or other servers. The present invention is suitable for use with the Internet, which refers to a specific global related set of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer software run using a central processing unit such as an Intel Pentium™ processor, AMD Athlon™ processor, Apple's Power PC, or the like or multiple processors. Computer software for operating and configuring client system 20 to communicate, process, and display data and media content as described herein is preferably downloaded and stored on a hard disk, but the entire program code, or portions thereof, may also be stored in any other volatile or nonvolatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $50_1$ to $50_N$ to client system 20 over the Internet, or transmitted over any other network connection (e.g., extranet, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 or compiled to execute on client system 20, or systems $20_{1-N}$. In some embodiments, no code is downloaded to client system 20, and needed code is executed by a server, or code already present at client system 20 is executed.

Search System

Figure 2:
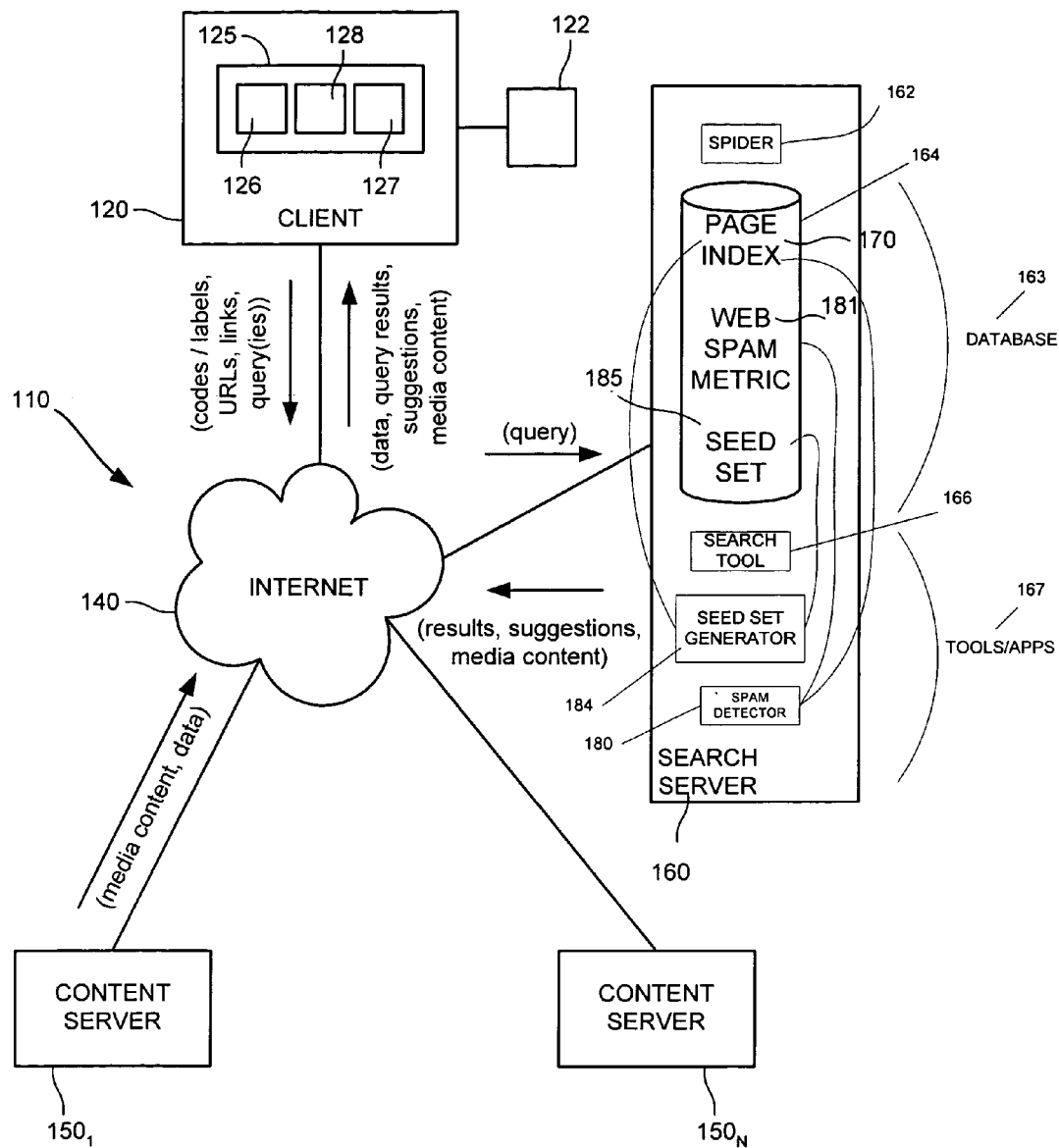
FIG. 2 is an exemplary block diagram of an information retrieval and communication network according to an embodiment of the present invention.

FIG. 2 illustrates another information retrieval and communication network 110 for communicating media content according to an embodiment of the invention. As shown, network 110 includes client system 120, one or more content server systems 150, and a search server system 160. In network 110, client system 120 is communicably coupled through Internet 140 or other communication network to server systems 150 and 160. As discussed above, client system 120 and its components are configured to communicate with server systems 150 and 160 and other server systems over the Internet 140 or other communication networks.

1 Client System

According to one embodiment, a client application (represented as module 125) executing on client system 120 includes instructions for controlling client system 120 and its components to communicate with server systems 150 and 160 and to process and display data content received therefrom. Client application 125 is preferably transmitted and downloaded to client system 120 from a software source such as a remote server system (e.g., server systems 150, server system 160 or other remote server system), although client application module 125 can be provided on any software storage medium such as a floppy disk, CD, DVD, etc., as discussed above. For example, in one aspect, client application module 125 may be provided over the Internet 140 to client system 120 in an HTML wrapper including various controls such as, for example, embedded JavaScript or ActiveX controls, for manipulating data and rendering data in various objects, frames and windows.

Additionally, client application module 125 includes various software modules for processing data and media content, such as a search module 126 for processing search requests and search result data, a user interface module 127 for rendering data and media content in text and data frames and active windows, e.g., browser windows and dialog boxes, and an application interface module 128 for interfacing and communicating with various applications executing on client 120. Examples of various applications executing on client system 120 for which application interface module 128 is preferably configured to interface with include various e-mail applications, instant messaging (IM) applications, browser applications, document management applications and others. Further, interface module 127 may include a browser, such as a default browser configured on client system 120 or a different browser.

2. Search Server System

According to one embodiment, search server system 160 is configured to provide search result data and media content to client system 120. Content server system 150 is configured to provide data and media content such as web pages to client system 120, for example, in response to links selected in search result pages provided by search server system 160. In some variations, search server system 160 returns content as well as, or instead of, links and/or other references to content.

Search server system 160 in one embodiment references various page indexes 170 that are populated with, e.g., pages, links to pages, data representing the content of indexed pages, etc. Page indexes may be generated by various collection technologies including automatic web crawlers, spiders, etc., as well as manual or semi-automatic classification algorithms and interfaces for classifying and ranking web pages within a hierarchical structure. These technologies may be implemented on search server system 160 or in a separate system (not shown) that generates a page index 170 and makes it available to search server system 160.

Search server system 160 is configured to provide data responsive to various search requests received from a client system, such as from search module 126. For example, search server system 160 may be configured with search related algorithms for processing and ranking web pages relative to a given query (e.g., based on a combination of logical relevance, as measured by patterns of occurrence of the search terms in the query; context identifiers; page sponsorship; etc.).

Link-Based Spam Detection

As shown in FIG. 2, search server system 160 works in combination with and provides its output (results, suggestions, media content, etc.) to a link-based spam detector 180 that returns a modified search list where the web spam pages have been demoted or removed from the list. Search sever system 160 is configured to operate a search engine in accordance with the embodiments of the present invention. The search engine is composed of three parts: one or more spiders 162, a database 163 and tools/applications 167. The spiders 162 crawl across the Internet gathering information; the database 163 contains the information the spiders gather as well as other information; and the tools/applications 167 include applications such as the search tool 166 that is used by users to search through the database. The database 167 contains the page index 170, which is used by the search tool. In addition, the search engine in accordance with the embodiment of the present invention includes a spam detector 180. The spam detector 180 executes various algorithms, described below, and stores a web spam metric 181 for the pages in the page index 170. As set forth above, the spam detector 180 in accordance with the embodiments of the present invention estimates a metric that corresponds with the effective mass of the hits and works in combination with the search tool 166 and the page index 170 and demotes those hits whose effective mass renders them likely to be artificially boosted by link-based spam. The determination of the effective mass for a given web document relies on a combination of techniques that in part assess the discrepancy between the link-based popularity (e.g., PageRank) and the trustworthiness (e.g., TrustRank) of a given web document. In one embodiment, the web spam detector 180 processes all the pages in the page index 170 to compute the web spam metric 181 for the pages in the index and stores the web spam metric 181 in the database 163. The metric 181 is independent of the search query that causes a document to be included in the search results.

The determination of the effective mass of a spam farm by the spam detector 180 for a given web document relies in part on the estimation of the difference between the link-based popularity (e.g., PageRank) and the trustworthiness (e.g., TrustRank) of a given web document. The determination of the trustworthiness of a given web document relies in part on how far away a given page is from an initial seed set of web documents that are known to be trustworthy (i.e., nonspam documents). Accordingly, the search engine in accordance with the embodiments of the present invention also includes a seed set generator 184 that works in combination with the page index 170 to form an initial seed set 185 of trusted web documents. The operation of the spam detector 180, which forms a web spam metric 181, and the operation of the seed set generator 184, which forms the seed set 185 are described below in further detail.

Spam Farm PageRank and TrustRank

In this section, the concepts of a spam farm, inlink page ranking (commonly referred to as "PageRank"), and trust-ranking are described. A spam farm is an artificially created set of pages that point to a spam target page to boost its significance. Trust-ranking ("TrustRank") is a form of PageRank with a special teleportation (i.e., jumps) to a subset of high-quality pages. Using techniques described herein, a search engine can automatically find bad pages (web spam pages) and more specifically, find those web spam pages created to boost their significance through the creation of artificial spam farms (collections of referencing pages). In specific embodiments, a PageRank process with uniform teleportation and a trust-ranking process are carried out and their results are compared as part of a test of the "spam-ness" of a page or a collection of pages. In addition, a novel method of constructing the inputs to a trust-ranking process is described below.

One aspect of the present invention is directed to an identification of (at least some of) spam pages based on the analysis of the hyperlink structure surrounding them. In particular, a novel process of estimating spam farm sizes is used. Since nonspam pages seldom point to spam, the specific authority distribution in TrustRank results in a certain degree of separation between nonspam and spam pages: high-quality nonspam web pages are expected to have the highest scores assigned by TrustRank.

TrustRank is related to a well-known web analysis algorithm, PageRank, which assigns numeric scores to each web page depending on scores of other pages that point to it. PageRank uses a technique called teleportation: a certain amount of the total score is delivered to some or all pages, according to the so-called teleportation distribution, which is usually a uniform distribution. Instead of using a uniform teleportation distribution, trust-ranking provides for a teleportation to only a small set of trusted (nonspam) web pages (i.e., the so-called "seed set"). This, in effect, results in distributing scores to other pages from the seed set only.

The descriptions below reference web pages. However, the reasoning, implementation, and algorithms are equally applicable to (1) a web of sites (logical groups of web content/pages and other types of web documents associated with the single authority), (2) an approximation of a web of sites represented by a web of hosts (HostRank), with some definition of graph edges between hosts (e.g., a host graph in which two hosts have a link if they contain at least one page each that are connected by a hyperlink, or other tests), (3) any other web page graph aggregation, and/or (4) a collection of links that have associated weights reflecting strength of referral.

Spam Farm

Figure 3A:
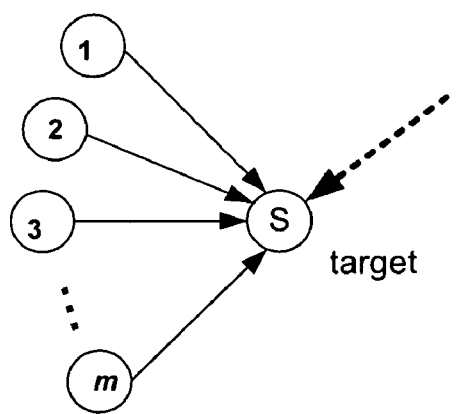
FIGS. 3A-B are exemplary diagrams of simple spam farms.
Figure 3B:
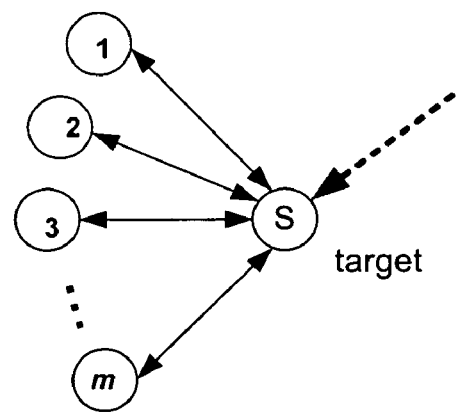

A spam farm is an artificially created set of pages (or alternatively hosts) that point to a spam target page to boost its significance. FIGS. 3A-B are exemplary diagrams showing two simple spam farms.

FIG. 3A shows that the spam farm has m pages all pointing to a target spam page, s. A process that allows for getting a good estimate of a spam farm size is described below. For every page i, a number, $M_i$, is computed, where the number $M_i$ is referred to as the "effective mass" of the page. For web spam pages, M serves as a good estimate of the size of the spam farm that is boosting that page.

In case of a simple spam farm, the effective mass approximates m. For a more complex farm, as for example, the spam farm shown in FIG. 3B, the effective mass M serves as an indicator, where a high M value is indicative of a spam farm. It should be recognized that while the description refers to web pages, the concepts can also be applied to groups of pages, hosts, and so on.

PageRank and TrustRank

The concept of PageRank is useful in the analysis of web pages. Among the many possible definitions for PageRank, the following linear system definition of page ranking is used:

$$x = cT^T x + (1-c)v. \quad \text{(Eqn. 1)}$$

In Equation 1:

T is a transition matrix whose elements are $T_{ij}=1/\text{outdeg}(i)$, if there is a link i→j from page i pointing to page j, or zero otherwise. Here, outdeg(i) is number of outlinks on page i serving as a normalization factor to make the matrix T stochastic, c is a teleportation constant, usually picked in the range 0.7-0.9, $x=(x_i)$ is an authority vector, where index i runs over all n pages, i=1:n, (n is the number of web pages)

$v=(v_i)$ is a teleportation vector, assumed to be a probability distribution, $0 \leq v_i \leq 1$, $v_1 + \ldots + v_n = 1$.

Iterative methods to solve Equation 1 are known. Equation 1 has an advantage of defining an authority vector that is linear with respect to teleportation vector.

For PageRank, p is the authority vector that would provide a solution of Equation 1 corresponding to uniform teleportation (i.e., when $v_i=1/n$). For TrustRank, t is the authority vector that would provide a solution of Equation 1 corresponding to a special teleportation (i.e., where v is such that k elements of v are nonzero and the rest are zero, where the nonzero elements have corresponding indices i in a trusted set).

Estimation of Effective Mass

The effective mass of a web page is used as an indicator to help determine whether a web page is a spam page.

Construction of an Estimate

It can be shown mathematically that for a potential spam page s, amongst any web page i, $$p_s - t_s = p_s^{boost} + b \cdot p_s^{leak} + (1-c)/n, \quad \text{(Eqn. 2)}$$

where the first term on the right side of the equality is due to a boost coming to a page from a supporting spam farm (with the farm being empty or nonexistent in the case of nonspam pages), while the second term is due to the authority leak from nonspam pages that sometimes erroneously point to spam pages. This leak is shown in FIGS. 3A-B as the dashed arrow representing different accidental hyperlinks from the rest of the web to a given page. For spam page s, the first term is very much dominant, since the motivation for a spammer creating a spam farm is to make the PageRank of s high. For a simple farm, $$p_s^{boost} = \frac{m \cdot c(1-c)}{n}, \quad \text{(Eqn. 3)}$$

Similar formulas are valid for farms of other structure. For example, for a farm with back links, $$p_s^{boost} = \frac{m \cdot c(1-c)}{(1-c^2)n}, \quad \text{(Eqn. 4)}$$

Under the condition that $$p_s^{leak} \ll p_s^{boost} \quad \text{(Eqn. 5)}$$

a good estimate for a size m of a simple spam farm is constructed as follows from equations (2) and (3)

$$M_s = \frac{n(p_s - t_s)}{c(1-c)}, \quad \text{(Eqn. 6)}$$

Equation 6 defines the effective mass $M_i$ that can be computed for any web page i. As mentioned above, if i is a spam page boosted by a simple spam farm, $M_i$ approximates the actual farm size m, and for farms of other structure, it differs only by a constant from the actual farm size, as illustrated by Equation 4. Such differences are not significant in view of the fact that actual spam farms are rather large (e.g., millions of boosting pages are fraudulently created).

For a nonspam page, $M_i$ will be some number that will not be very large in absolute terms or relative to $p_i$. The link-based spam detection in accordance with the embodiments of the present invention will discover this and not nominate such a page as a potential web spam page based on $M_i$ as an indicator.

Spam Detection Process

The following exemplary process is used to detect link-based spam. The process is elegantly simple and effective, in that it aims to find pages with highest effective mass. However, effective mass provides a good approximation to a spam size only if Equation 5 is satisfied, ensuring that the link-based popularity of a page due to allocation of that popularity from trusted web pages is much smaller than the link-based popularity of a page due to artificial boosting by spam pages. Under the condition of Equation 5, the spam-detection process is able to distinguish between legitimately popular pages and those that have been made popular by a linking spam farm. The techniques in accordance with the embodiments of the present invention ensure that the condition of Equation 5 is fulfilled. This is performed in Step C below in which $\eta > 1$ is an algorithm parameter serving as a threshold. It can be shown that the large ratios in C correspond to pages satisfying Equation 5. Overall, an exemplary process includes the following:

A. For all pages (hosts, etc.) i in a list (e.g., a list of hits related to a query, or the page index) find their effective masses $M_i$ according to equation (6)

B. Sort pages i in decreasing order of $M_i$ and retain or identify a top portion of the sorted list. Alternately, the entire list may be kept, although that might require too many resources, therefore not retaining low $M_i$ pages is more efficient. This identification and/or retention may be done at any step. A part of the selection process is directed to selecting pages with both a high $M_i$ and a high $M_i/p_i$.

C. Find ratios $M_i/p_i$ for all the pages i retained in the list.

D. Delete from the list pages i with $M_i/p_i < \eta$.

E. Retained pages constitute spam.

In experiments, so detected spam pages actually were confirmed to be a spam (by human judgment) in most cases. This means that the false positive rate is likely to be low using these techniques.

Seed Set

The process described above relies on TrustRank, a solution of equation (1), with a special teleportation distribution that is associated with a so-called seed set. The seed set is a set of k high-quality web pages known to be nonspam. An aspect of the embodiments of the present invention is directed to the finding of an appropriate seed set of trustworthy (i.e., nonspam) pages or sites. One way of identifying a seed set of trusted web pages is to nominate certain web pages based on human editorial judgment. However, human evaluation is expensive and time consuming. While retaining the option of manually selecting a seed set as a viable alternative, another technique that constructs a seed set semi-automatically is described below.

The seed selection process relies on the observation that seed pages should have two important features, namely that: 1) a large number of other pages should be reachable starting from seed pages and iteratively following outlinks on encountered web pages; that is, seed pages should provide high coverage, and 2) seed pages should be of very high quality, so that the chance of encountering a link from nonspam to spam should be minimal.

To ensure the first feature, a ranking of all pages (i.e., pages in the page index) is produced. For this, the following linear system shown by Equation 7 is used.

$$y = cU^T y + (1-c)v, \quad \text{(Eqn. 7)}$$

In this system

U is a reverse transition matrix whose elements are $U_{ij} = 1/\text{indeg}(i)$, if there is a link $j \to i$, or zero otherwise. Here indeg(i) is number of inlinks to page i serving as a normalization factor to make the matrix U stochastic, c is a teleportation constant, usually picked in the range 0.7-0.9, $y=(y_i)$ is an authority vector where index i runs over all n pages, i=1:n, $v=(v_i)$ is a teleportation vector, assumed to be a probability distribution, $0 \leq v_i \leq 1$, $v_1 + \ldots + v_n = 1$.

Note that the system described by Equation 7 is similar to that of Equation 1, except that Equation 7 uses the reverse transition matrix U instead of the regular transition matrix T. The reverse transition matrix corresponds to the web graph with the directionality of links reversed. For this, the solution y to Equation 7 with uniform teleportation is referred to as Inverse PageRank. Inverse PageRank is a measure of how much of the web can be reached from a page by following the outlinks on that page.

To ensure the second feature of seed pages, the pages with highest Inverse PageRank are further processed by a human editor. The human editor selects which candidates (pages that provide high coverage as measured by Inverse PageRank) are actually high-quality nonspam pages. The pages selected by the human editor are then included into the seed set and used in TrustRank computation, as described above.

An exemplary seed set construction process is summarized as follows:

A. For all pages (hosts, etc.) i find their Inverse PageRank $y_i$ according to equation (7)

B. Sort pages i, in decreasing order of $y_i$ and retain a top of the sorted list, or otherwise identify and retain a set of highest ranked pages C. Use human editor(s) to evaluate the quality of pages retained in the list D. Delete from the list pages that were deemed inappropriate by the editor(s)

E. Retained pages constitute the seed set.

Experimental results have shown that the resulting seed set is suitable for TrustRank computation and spam detection based on mass estimation as derived from PageRank and TrustRank.

The embodiments described herein may make reference to web sites, links, and other terminology specific to instances where the World Wide Web (or a subset thereof) serves as the search corpus. It should be understood that the systems and processes described herein can be adapted for use with a different search corpus (such as an electronic database or document repository) and that results may include content as well as links or references to locations where content may be found.

Thus, although the invention has been described with respect to specific embodiments, it will be appreciated that the invention is intended to cover all modifications and equivalents within the scope of the following claims.

What is claimed is:

1. A computer implemented method of ranking search hits in a search result set, the method comprising:

receiving a query from a user;

generating a list of hits related to the query, wherein each of the hits has a relevance to the query, wherein at least one hit is pointed to by a link in a boosting document, and wherein the link in the boosting document artificially elevates the relevance of the at least one hit to the query;

determining a first measure for said at least one hit, wherein the first measure is a link-based popularity measure for said at least one hit;

determining a second measure for said at least one hit, wherein the second measure is a trustworthiness measure for said at least one hit indicative of the likelihood that said at least one hit is a reputable document;

generating a metric for said at least one hit, based at least in part on a discrepancy between the first measure and the second measure;

wherein the metric is representative of the number of boosting documents that contain links, to said at least one hit, which artificially elevate the relevance of said at least one hit to the query;

comparing a threshold value to a value that is based, at least in part, on the metric;

processing the list of hits to form a modified list based in part on the comparing, wherein said at least one hit is either excluded from said modified list, or is presented in said modified list with a lower relevance than was attributed to said at least one hit in said list of hits; and transmitting the modified list to the user as a response to said query.

2. The method of claim 1, wherein said generating said metric is performed prior to said receiving the query.

3. The method of claim 1, wherein determining the second measure comprises forming a seed set of reputable documents, the seed set of reputable documents comprising links to other documents;

assigning a trust value to each of the documents in the seed set;

propagating the trust value to each of a plurality of documents being pointed to by at least one of the documents in the seed set; and assigning a prorated trust value to each of the plurality of documents being pointed to by at least one of the documents in the seed set.

4. The method of claim 3, wherein said forming the seed set comprises determining for each of a plurality of documents an outlink metric representative of the number of outlinks contained in each of the plurality of documents, respectively;

ranking the plurality of documents using the outlink metric;

identifying a set of highest ranked documents in the plurality of documents;

evaluating the quality of each of the set of highest ranked documents;

forming a modified set of highest ranked documents by removing from the set of highest ranked documents those documents deemed inappropriate; and forming the seed set using the modified set of highest ranked documents.

5. The method of claim 1 wherein:

the steps of determining a first measure, determining a second measure, and generating a metric are performed for each hit in the list of hits;

the method further includes the steps of:

after generating the metric for each hit in the list of hits, sorting the list based on the metrics generated for the hits in the list of hits, to produce a sorted list;

identifying a top portion of the sorted list, wherein the hits in said top portion are associated with metrics that are higher than hits that are not in said top portion;

for each hit in the top portion of the sorted list, determining whether to classify the hit as spam based on the ratio of the metric to the first measure.

6. A computer implemented computer-readable storage medium storing instruction for ranking search hits in a search result set, instructions including instructions for performing the steps of:

receiving a query from a user;

generating a list of hits related to the query,
wherein each of the hits has a relevance to the query,
wherein at least one hit is pointed to by a link in a boosting document, and
wherein the link in the boosting document artificially elevates the relevance of the at least one hit to the query;
determining a first measure for said at least one hit, wherein the first measure is a link-based popularity measure for said at least one hit;
determining a second measure for said at least one hit, wherein the second measure is a trustworthiness measure for said at least one hit indicative of the likelihood that said at least one hit is a reputable document;
generating a metric for said at least one hit, based at least in part on a discrepancy between the first measure and the second measure;
wherein the metric is representative of the number of boosting documents that contain links, to said at least one hit, which artificially elevate the relevance of said at least one hit to the query;
comparing a threshold value to a value that is based, at least in part, on the metric;
processing the list of hits to form a modified list based in part on the comparing, wherein said at least one hit is either excluded from said modified list, or is presented in said modified list with a lower relevance than was attributed to said at least one hit in said list of hits; and
transmitting the modified list to the user as a response to said query.

7. The computer-readable storage medium of claim 6, wherein generating said metric is performed prior to said receiving the query.

8. The computer-readable storage medium of claim 6, wherein determining the second measure comprises
forming a seed set of reputable documents, the seed set of reputable documents comprising links to other documents;
assigning a trust value to each of the documents in the seed set;
propagating the trust value to each of a plurality of documents being pointed to by at least one of the documents in the seed set; and
assigning a prorated trust value to each of the plurality of documents being pointed to by at least one of the documents in the seed set.

9. The computer-readable storage medium of claim 8, wherein said forming the seed set comprises
determining for each of a plurality of documents an outlink metric representative of the number of outlinks contained in each of the plurality of documents, respectively;
ranking the plurality of documents using the outlink metric;
identifying a set of highest ranked documents in the plurality of documents;
evaluating the quality of each of the set of highest ranked documents;
forming a modified set of highest ranked documents by removing from the set of highest ranked documents those documents deemed inappropriate; and
forming the seed set using the modified set of highest ranked documents.

10. The computer-readable medium of claim 6 wherein:
the steps of determining a first measure, determining a second measure, and generating a metric are performed for each hit in the list of hits;
the instructions further include instructions for performing the steps of:
after generating the metric for each hit in the list of hits, sorting the list based on the metrics generated for the hits in the list of hits, to produce a sorted list;
identifying a top portion of the sorted list, wherein the hits in said top portion are associated with metrics that are higher than hits that are not in said top portion;
for each hit in the top portion of the sorted list, determining whether to classify the hit as spam based on the ratio of the metric to the first measure.

* * * * *